June 2, 1942.  F. W. SCHWINN  2,284,624
FABRICATED STRUCTURE FOR BICYCLE FRAMES OR THE LIKE
Filed May 20, 1939
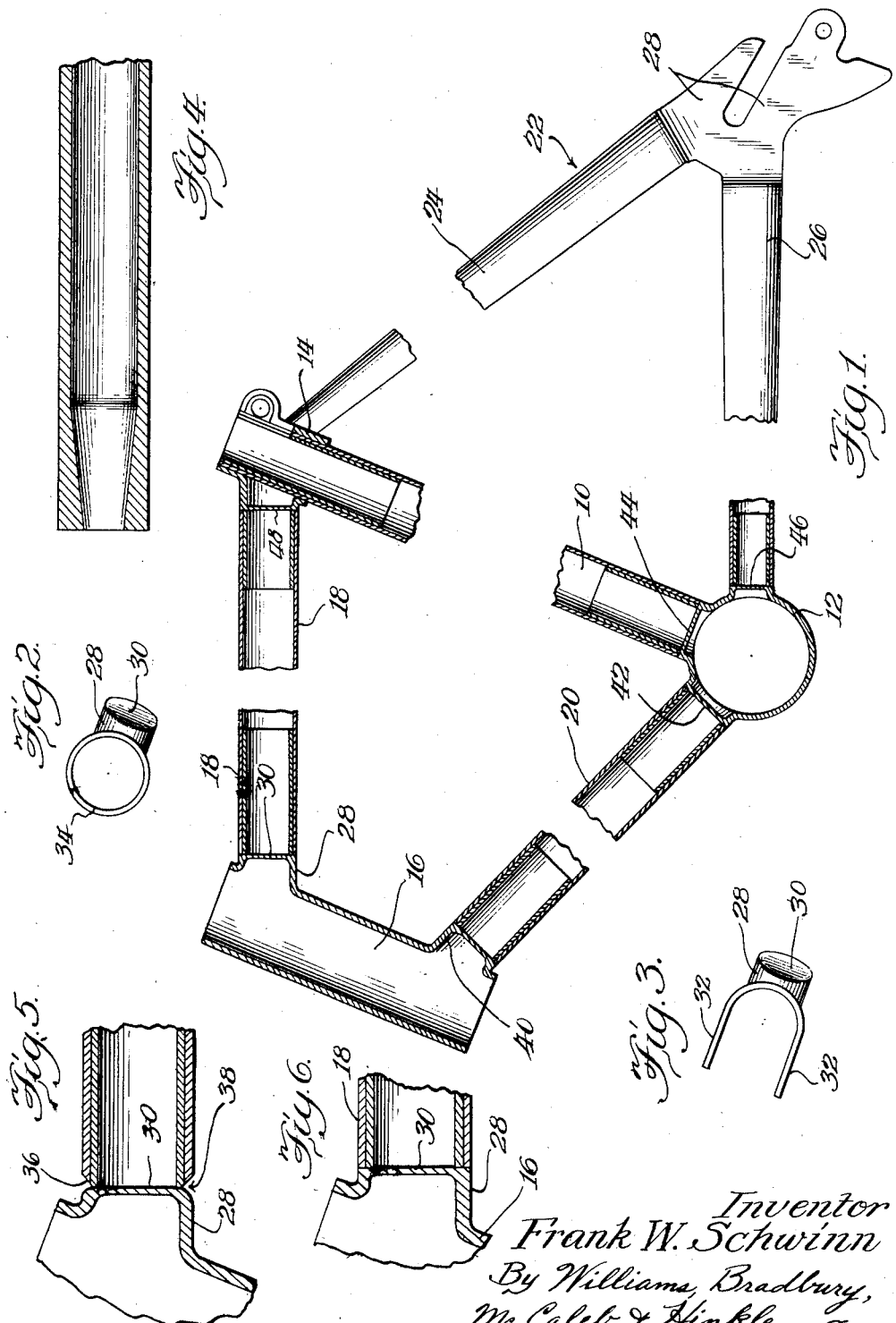
Inventor
Frank W. Schwinn
By Williams, Bradbury,
McCaleb & Hinkle Attys Patented June 2, 1942

2,284,624

UNITED STATES PATENT OFFICE 2,284,624

FABRICATED STRUCTURE FOR BICYCLE FRAMES OR THE LIKE

Frank W. Schwinn, Chicago, Ill.

Application May 20, 1939, Serial No. 274,682

2 Claims. (Cl. 287—54)

My invention contemplates and provides welded or brazed joints which are particularly adapted for use in fabricating bicycle frames or like structures wherein an end of a tube is welded in abutting relation to the side wall of another tube or to other variously shaped sections. Although the present invention is illustrated in connection with bicycle frames, it will be appreciated that it may be used in the manufacture of other similar structures.

In the past it has been common practice in fabricating bicycle frames, to provide crank hangers and steering heads, for instance, which are cylindrical tubes and then form the ends of the smaller diameter tubes so that they fit the curvature of these larger tubes to which they are welded or brazed. This formation of the ends of the tubes to be joined to the sides of other tubes is a comparatively expensive manufacturing operation, particularly when the tubes are joined at angles other than 90 degrees. Also, it is much more difficult to weld such a joint than it would be if the weld could be annular, and if the welding or brazing process throws any flash, it will be appreciated that this flash is difficult to remove.

The principal object of my invention is to provide a novel joint having an end of one tube welded to the side of another that simplifies the preparation of the tubes for welding, facilitates the welding operation, facilitates the removal of any flash formed in the welding operation, and gives a better weld.

Another object of my invention is to provide an improved method of joining tubes which is particularly adapted for welding on automatic or semi-automatic machines.

An additional object is the provision of a novel method of making better welded or brazed joints at lower cost than by methods heretofore in use.

Another object of my invention is to provide a novel method of welding an end of one tube to the side of another wherein the resulting weld is annular.

These and other features, objects and advantages of the invention will appear from the following detailed description and accompanying drawing, in which Fig. 1 is a vertical medial sectional view through a bicycle frame fabricated according to the present invention;

Fig. 2 is a plan view of the bicycle steering head shown in section in Fig. 1;

Fig. 3 is a plan view similar to Fig. 2 showing the steering head at one stage in its formation;

Fig. 4 is a longitudinal sectional view of a tube end which has been prepared for welding by upsetting in order to provide a thicker wall section;

Fig. 5 is a longitudinal sectional view illustrating a tube joint as prepared for torch welding or brazing by the present method; and Fig. 6 is a longitudinal sectional view illustrating a tube joint as prepared by the present method for welding by one of the newer electric welding processes, which leave little or no flash.

Similar characters of reference refer to similar parts throughout the several views.

Referring to Fig. 1, the bicycle frame there illustrated comprises a saddle post mast 10 welded at its lower end to a crank hanger 12 and at its upper end to a collar or fitting 14. A steering head 16 has its upper end welded to an upper reach tube 18 which extends rearwardly and has its opposite end welded to the collar or fitting 14. A lower reach tube 20 is similarly welded between the lower end of the steering head 16 and the crank hanger 12. The rear wheel fork 22 comprises the upper and lower stays 24 and 26 respectively, welded at their rearwardly converging ends to slotted connectors 28, while the forward ends of these upper and lower stays are welded respectively to the collar 14 and crank hanger 12.

As an example of the adaptation of my welding method to a bicycle frame as set forth above, the welded joint between the steering head 16 and upper reach tube 18 will be described in detail. The steering head is fabricated from a flat rectangular blank of steel which is first bent into a U-shape with the radius of curvature of the central portion of the U substantially the same as the radius of curvature of the finished steering head. A portion of the curved surface of the U-shaped piece is then drawn outwardly to form a boss 28 having a diameter equal to the diameter of the upper reach tube 18. The outward face 30 of this boss is made square with its axis by a coining operation, so that the finished boss appears as seen in Figs. 1, 2, 3 and 6. It is important that, as seen in Figs. 1 and 6, the axis of the boss 28 be coaxial with the axis of the reach tube 18, and that the diameter of its face 30 be the same as the diameter of the reach tube 18.

The two arms 32 of the U-shaped member are then bent around into abutting relation and welded together at 34 to complete the steering head as seen in Fig. 2.

Thus, the upper reach tube 18 is merely cut off square to the proper length, and the end of this tube brought into contact with the face 30 of the boss 28 and the two pieces welded together.

If the welding method used is one of the recently devised electric processes which throw little or no flash, such for instance as the so-called Hart process, the flash welding process, the percussion welding process, or various refinements and variations of these processes, the weld will usually require no cleaning.

If the joint is torch welded or brazed, either automatically or by hand, the annular flash around the joint may be readily machined away.

As illustrated in Fig. 5, for torch welding or brazing, it is preferable to provide the boss 28 with a somewhat rounded end, so that in conjunction with the beveled end 36 of the tube joined thereto an annular groove 38 is formed for the reception of the weld metal.

When it is desired to use thin walled tubes for the reach tubes and similar parts, the ends of these tubes may be strengthened either by upsetting these ends to provide a thicker section as seen in Fig. 4 or by drawing the outside tube down over a tube of smaller diameter as illustrated in Figs. 1, 5 and 6.

Although the present method has been described as applied to the fabrication of the joint between the steering head and upper reach tube of a bicycle, it will be understood that other joints may be formed by the same method. For instance, in the frame shown in Fig. 1, the steering head has in addition to the boss 28 described above, a second boss 40 in alignment with, and adapted to be welded to, the lower reach tube 20. The crank hanger 12 has similar bosses 42, 44 and 46 to be welded respectively to the lower reach tube 20, saddle post mast 10 and lower stays 26. Likewise, the collar or fitting 14, which is welded to the upper end of the saddle post mast 10 is provided with a boss 48 to be welded to the upper reach tube 18, and other bosses, not shown, to be welded to the upper stays 24.

Having thus illustrated and described my invention, what I claim is new and useful and desire to secure by Letters Patent of the United States is:

1. As a new article of manufacture, a pair of tubes joined by welding, one of the tubes having a boss pressed out of a wall thereof, the boss having a substantially planiform end wall of cylindrical cross-sectional shape, and a second tube having an open end of cylindrical cross-section corresponding in size and shape to the end wall of said boss, said second tube being welded throughout its periphery to the first tube with said open tube end in registering position with the boss end wall, the planiform end wall of the boss comprising a transverse web reinforcing the second tube wall and the side wall of the boss in the plane of the weld.

2. As a new article of manufacture, a pair of tubes joined by welding, one of the tubes having a welded seam therein and having a boss pressed out of a wall thereof, the boss having a substantially planiform end wall, the welded seam of said tube extending lengthwise throughout the length of said tube, said seam being located circumferentially beyond the lateral limits of said boss, and a second tube having an open end corresponding in outside size and shape to the end wall of said boss, said second tube being welded to the first tube with said open tube end in registering position with the boss end wall, the planiform end wall of the boss comprising a transverse web reinforcing the second tube wall and the side wall of the boss in the plane of the weld.

FRANK W. SCHWINN.